US008805573B2

(12) United States Patent
Brunner et al.

(10) Patent No.: US 8,805,573 B2
(45) Date of Patent: Aug. 12, 2014

(54) SYSTEM AND METHOD FOR ORDER FULFILLMENT

(75) Inventors: Daniel T. Brunner, Indianapolis, IN (US); Michael C. Mountz, Lexington, MA (US); Michael T. Barbehenn, Bedford, MA (US); Peter R. Wurman, Acton, MA (US); William J. Watt, Wakefield, MA (US); Eryk B. Nice, Medford, MA (US)

(73) Assignee: Amazon Technologies, Inc., Reno, NV (US)

( * ) Notice: Subject to any disclaimer, the term of this patent is extended or adjusted under 35 U.S.C. 154(b) by 23 days.

(21) Appl. No.: 13/343,458

(22) Filed: Jan. 4, 2012

(65) Prior Publication Data

US 2013/0173049 A1 Jul. 4, 2013

(51) Int. Cl.
*G06F 7/00* (2006.01)

(52) U.S. Cl.
USPC ............ 700/214; 700/216; 700/213; 700/230

(58) Field of Classification Search
USPC .................................................. 700/214, 215
See application file for complete search history.

(56) References Cited

U.S. PATENT DOCUMENTS

| | | | | |
|---|---|---|---|---|
| 6,289,260 | B1 * | 9/2001 | Bradley et al. ................ | 700/216 |
| 7,894,932 | B2 * | 2/2011 | Mountz et al. ................ | 700/214 |
| 7,894,933 | B2 * | 2/2011 | Mountz et al. ................ | 700/214 |
| 2007/0293978 | A1 | 12/2007 | Wurman et al. ............... | 700/213 |
| 2009/0185884 | A1 * | 7/2009 | Wurman et al. ............... | 414/270 |
| 2009/0299521 | A1 * | 12/2009 | Hansl et al. ................... | 700/215 |
| 2010/0241269 | A1 * | 9/2010 | Ham et al. ..................... | 700/214 |
| 2013/0054005 | A1 | 2/2013 | Stevens et al. ................ | 700/216 |

OTHER PUBLICATIONS

USPTO; Office Action for U.S. Appl. No. 13/216,394 in the name of Rob Stevens, et al.; 14 pages, Apr. 11, 2013.
"Snox Engineering Group—Customization picture," www.snox.com, Winter 2010, 1 page, 2010.
USPTO; Non-Final Office Action for U.S. Appl. No. 13/216,394 in re: Rob Stevens, et al.; (12 pgs.) Dec. 27, 2013.
USPTO; Response Pursuant to 37 C.F.R. §1.116; U.S. Appl. No. 13/216,394; in re: Rob Stevens, et al.; Dec. 9, 2013.
USPTO; Final Office Action for U.S. Appl. No. 13/216,394 in re: Rob Stevens, et al.; (17 pgs.) Oct. 10, 2013.
USPTO; Response Pursuant to 37 C.F.R. §1.111; U.S. Appl. No. 13/216,394; in re: Rob Stevens, et al.

* cited by examiner

*Primary Examiner* — Ramya Burgess
*Assistant Examiner* — Thomas Randazzo
(74) *Attorney, Agent, or Firm* — Baker Botts L.L.P.

(57) ABSTRACT

A system includes a first mobile drive unit and a second mobile drive unit. The system also includes a first inventory holder, a second inventory holder, and a third inventory holder. An inventory station includes a first location and a second location and the inventory station operable to receive a first inventory item from the first inventory holder at the first location. The first inventory holder transported by the first mobile drive unit. The inventory station also operable to receive a second inventory item from the second inventory holder at the first location. The second inventory holder transported by the second mobile drive unit. The inventory station also operable to receive a third inventory item from the third inventory holder at the second location. The third inventory holder is fixed at the second location while the inventory station receives the first and second inventory item.

56 Claims, 4 Drawing Sheets

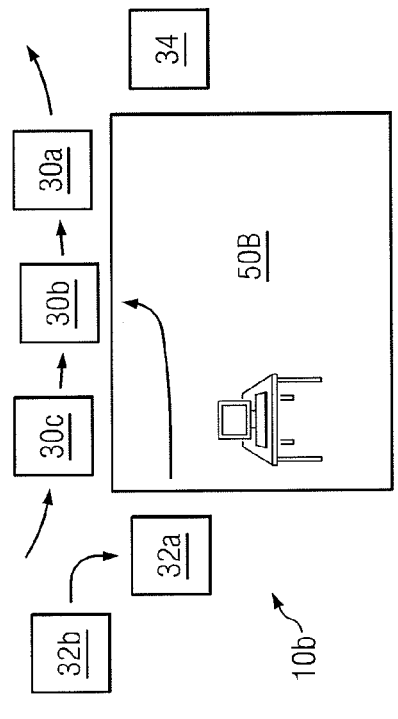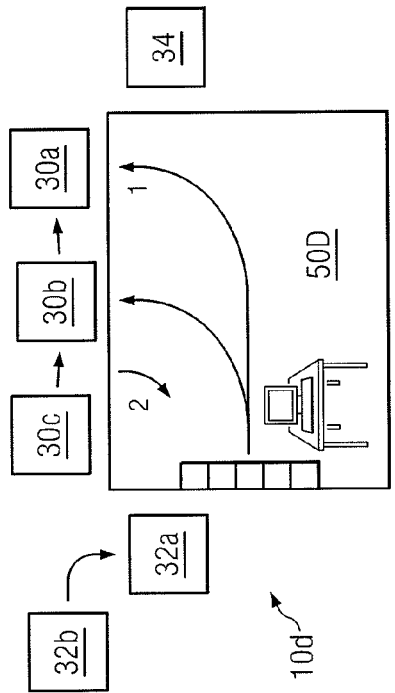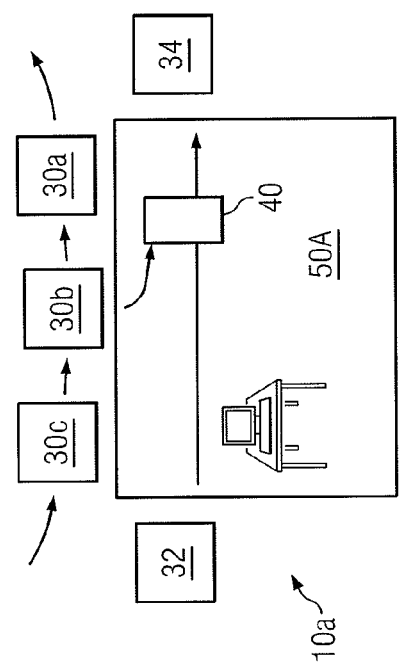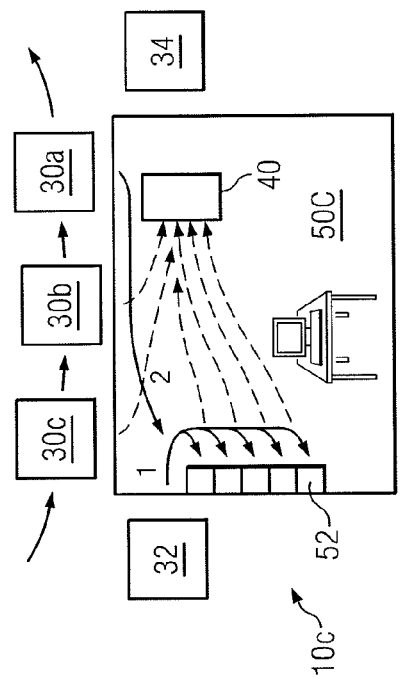

SYSTEM AND METHOD FOR ORDER FULFILLMENT

TECHNICAL FIELD OF THE INVENTION

The present disclosure relates generally to inventory management systems, and more specifically to a system and method for order fulfillment.

BACKGROUND OF THE INVENTION

Modern inventory systems face increasing demands to efficiently fulfill orders despite increasing complexity and diversity of inventories and orders. Inventory systems suffering from inefficient use of system resources face lower system throughput, unfinished or delayed tasks, and unacceptable response times. Accordingly, such inventory systems face the challenge of making more efficient use of time, space, equipment, and manpower in order to meet those rising demands.

SUMMARY OF THE INVENTION

In accordance with the teachings of the present disclosure, disadvantages and problems associated with fulfilling orders in inventory management systems have been substantially reduced or eliminated. In particular, an inventory system is provided that includes an inventory station operable to receive inventory items from various inventory holders.

In accordance with one embodiment of the present disclosure, a system includes a first mobile drive unit and a second mobile drive unit. The system also includes a first inventory holder, a second inventory holder, and a third inventory holder. An inventory station includes a first location and a second location and the inventory station operable to receive a first inventory item from the first inventory holder at the first location. The first inventory holder is transported by the first mobile drive unit. The inventory station is also operable to receive a second inventory item from the second inventory holder at the first location. The second inventory holder is transported by the second mobile drive unit. The inventory station is also operable to receive a third inventory item from the third inventory holder at the second location. The third inventory holder is fixed at the second location while the inventory station receives the first inventory item and the second inventory item.

In accordance with another embodiment of the present disclosure a method includes receiving an order for a first inventory item, a second inventory item, and a third inventory item. The first inventory item is received from a first inventory holder at a first location associated with an inventory station, and the first inventory holder is transported to the inventory station by a first mobile drive unit. The second inventory item is received from a second inventory holder at the first location associated with the inventory station, and the second inventory holder is transported to the inventory station by a second mobile drive unit. The third inventory item is received from a third inventory holder at a second location associated with the inventory station, and the third inventory holder is fixed at the second location while the order for the first inventory item, the second inventory item, and the third inventory item is assembled.

Technical advantages of certain embodiments include the ability to provide an inventory system with an inventory station operable to receive inventory items from various inventory holders. Another technical advantage may include the ability to keep an inventory holder at an inventory station containing certain inventory items while other inventory holders carry other inventory items to the inventory station. The inventory items in the stationary inventory holder may be determined based on a product velocity, which may be higher than other inventory items. Thus, inventory items with a relatively high product velocity may be available at the inventory station to fill orders while other inventory items are received at the station by inventory holders transported by mobile drive units. Another technical advantage may be the ability to use the relative product velocities of inventory items, which may allow the inventory items that remain stationary at the inventory station to be changed based on changes in product velocity. One other technical advantage may include the ability to fill an order from a combination of dynamically arriving inventory items arriving on inventory holders via mobile drive units and stationary inventory. The static stationary inventory may be located in an inventory holder capable of being transported by mobile drive units and/or may be located in a fixed array of inventory holders. Moving inventory from a mobile inventory holder to a fixed array of inventory holders may allow the mobile inventory holder to be repurposed for other tasks. Inventory stations may use a combination of stationary inventory holders, fixed arrays of inventory holders, and dynamic inventory holders. In addition, particular embodiments may use any number of stationary inventory holders and arrays and/or may use inventory holders of varying dimensions and load carrying abilities. Moreover, stationary inventory holders at inventory stations may be replaced with other stationary inventory holders that can be dynamically replaced as appropriate. Likewise, inventory items may be dynamically removed from the fixed array of inventory holders and/or replaced with other inventory items as appropriate. Accordingly, the efficiency of the inventory system may increase.

Other technical advantages of the present disclosure will be readily apparent to one of ordinary skill in the art from the following figures, description, and claims. Moreover, while specific advantages have been explained above, various embodiments may include some, all, or none of those advantages.

BRIEF DESCRIPTION OF THE DRAWINGS

For a more complete understanding of the present invention and its features and advantages, reference is now made to the following description, taken in conjunction with the accompanying drawings, in which:

FIGS. 2A to 2D are diagrams illustrating example embodiments of operation of an inventory system;

DETAILED DESCRIPTION OF THE INVENTION

Embodiments of the present invention and its advantages are best understood by referring to FIGS. 1 through 4, wherein like numerals refer to like and corresponding parts of the various drawings.

Figure 1:
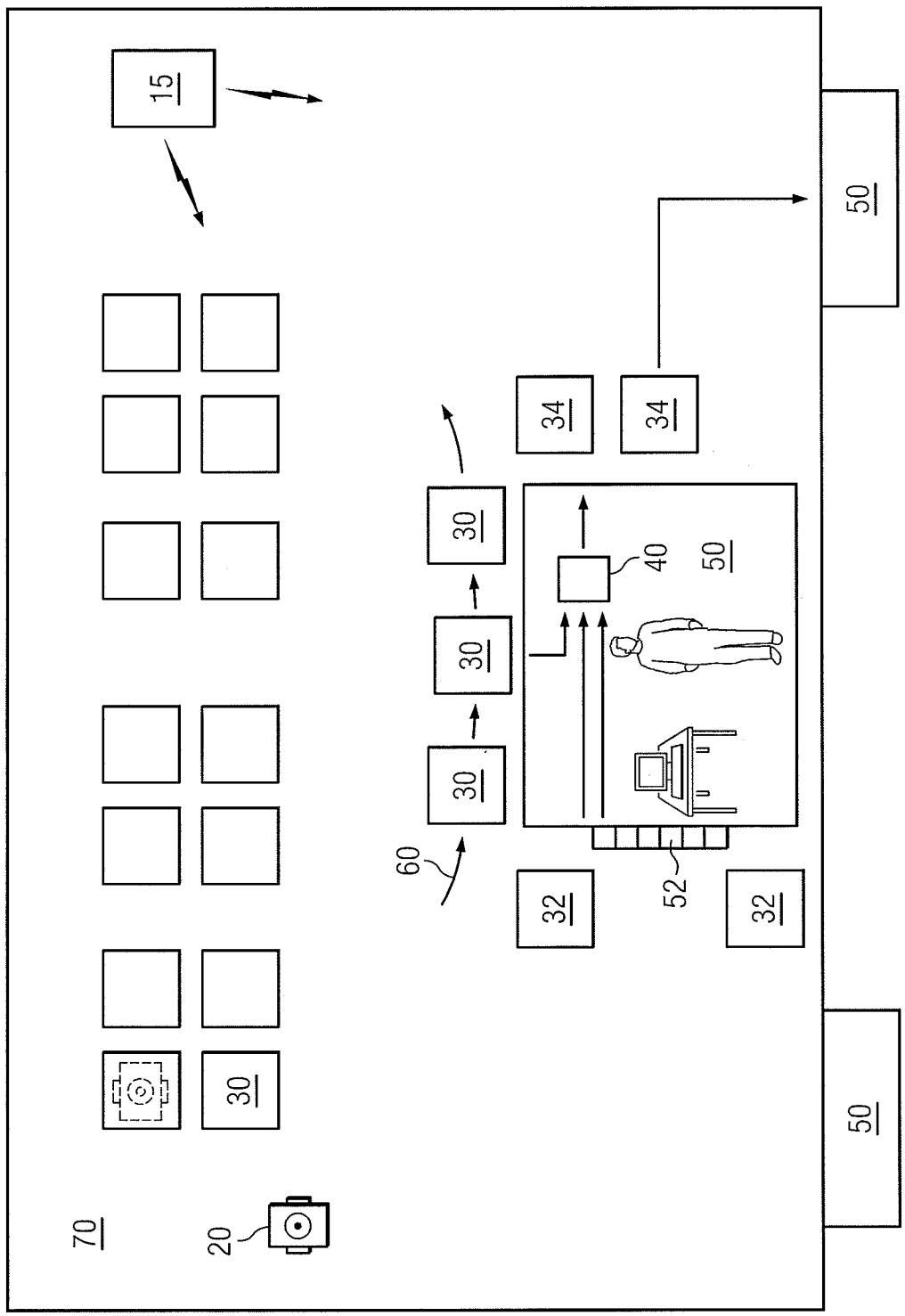
FIG. 1 is a diagram illustrating example embodiments of an inventory system.

FIG. 1 is a diagram illustrating example embodiments of an inventory system 10 for fulfilling orders 40. Inventory system 10 includes management module 15, mobile drive units 20, inventory holders 30, inventory holders 32, order holders 34, and inventory stations 50. In some embodiments, inventory stations 50 may include an array 52 of inventory holders.

Inventory holders 30 interface with inventory station 50 and may be arranged in a queue 60. In general, system 10 is capable of transporting inventory holders 30, inventory holders 32, and/or order holders 34 between locations in workspace 70 to facilitate the efficient fulfillment of orders 40. Inventory holder 32 may be located at inventory station 50 such that inventory items from inventory holder 32 are available while inventory items are received from inventory holders 30 in queue 60. In some embodiments, inventory items from array 52 are available while inventory items are received from inventory holders 30 in queue 60. In some embodiments, inventory items from inventory holders 32 and array 52 are available while inventory items are received from inventory holders 30 in queue 60. Inventory holders 32 may be assigned and/or transported to inventory station 50 and/or inventory items may be assigned to array 52 based on minimizing the cost of transporting inventory items within inventory holders 30 to inventory station 50, where cost may be based on the number of tasks, travel distance, and/or time required by mobile drive units 20 and/or other components of inventory system 10. For example, inventory holders 32 may be assigned and/or transported to inventory station 50 as determined by product velocity. Additionally or alternatively, inventory items may be assigned to array 52 as determined by product velocity.

Some inventory systems face large fluctuations in product velocity. For example, the release of a new product may spark a surge in orders for those items. Product velocity may refer to the frequency of orders requiring particular inventory items and/or types of inventory items within system 10 in a given time period. In some embodiments, product velocity may refer to the relative numbers of each inventory item and/or type of inventory item required and/or predicted to be required by orders within system 10. For example, an inventory item may have a relatively high product velocity if that inventory item is more frequently required by orders 40 within system 10 as compared to other inventory items. In some embodiments, product velocity may refer to the quantity demanded of a given inventory item in a given time period. Alternatively or in addition, product velocity may simply refer to the quantity of an inventory item requested by open and/or received orders 40 within inventory system 10. Product velocity may be determined based on past order information, present order information, known and/or expected demand, and/or predicted future order information.

Management module 15 represents any suitable combination of hardware, software and controlling logic operable to coordinate the operation of various components within system 10. In some embodiments, management module 15 may include one or more processors, one or more memory modules, and one or more communication interfaces. Logic may be encoded on one or more non-transitory computer-readable media and may be executed by the one or more processors. Management module 15 may include logic to schedule and execute various tasks involving the movement and processing of inventory items within system 10. For example, management module 15 may assign tasks to mobile drive units 20 and/or inventory stations 50. Management module 15 may include logic to facilitate coordination of the movement of mobile drive units 20 within workspace 70 in order to complete the assigned tasks. Management module 15 may include one or more communication interfaces to send information to and receive information from mobile drive units 20. For example, management module 15 may transmit, to one or more mobile drive units 20, task assignment information, destination information, path planning information, reservation information, and/or any other appropriate information.

Management module 15 may communicate information with one or more inventory stations 50. Management module 15 may, in some embodiments, include logic to designate and/or assign inventory holders 32 to inventory station 50. For example, management module 15 may determine the product velocity of inventory items in inventory system 10. Management module 15 may additionally or alternatively include logic to assign inventory items to array 52. It should be noted that while management module 15 is depicted as a separate component within inventory system 10, the functionality performed by management module 15 may be distributed over several devices. For example, the operations of management module 15 may be performed by mobile drive units 20 and/or other appropriate components of inventory management system 10. As a result, any or all of the interaction between a particular mobile drive unit 20 and management module 15 that is described below may, in particular embodiments, represent peer-to-peer communication between mobile drive units 20.

Management module 15 may determine one or more inventory items responsive to orders 40 for one or more inventory items. Management module 15 may determine which inventory holders 30 store those inventory items. In some embodiments, management module 15 may, alternatively or additionally, determine whether those inventory items are stored in inventory holder 32 and/or array 52. Management module 15 may then assign tasks to transport those inventory holders 30 to queue 60 at inventory station 50. Inventory holders 30 may transport inventory items needed for order 40 that are not in inventory holder 32 and/or array 52. Based on their respective task assignments, mobile drive units 20 may transport the inventory holders 30 with inventory items responsive to order 40 to inventory station 50.

Management module 15 may replenish inventory items at inventory stations 50 in any suitable manner. For example, management module 15 may determine, in some embodiments, that a quantity of inventory items in inventory holder 32 and/or array 52 has fallen below a threshold and/or may determine that some other rule for replenishing inventory items stationed at inventory station 50 has been triggered. In response, management module 15 may assign another inventory holder 32 that holds an additional quantity of inventory items to replace inventory holder 32 and/or may assign a task to remove inventory holder 32 from inventory station 50. Management module 15 may additionally or alternatively assign inventory holder 32 to another inventory station 50 operable to replenish inventory items into inventory holder 32. In some embodiments, management module 15 may assign a task to transport inventory holder 30 containing an additional quantity of the given inventory item to queue 60 so that those inventory items may be received into inventory holder 32 and/or array 52. Accordingly, management module 15 may provide for the replenishment of the inventory items in inventory holder 32 and/or array 52 at inventory station 50.

It should be noted, however, that while various mobile drive units 20 are depicted as arriving at inventory station 50 in a queue 60, that need not necessarily be the case. For example, in some embodiments, inventory station 50 may include more than one location at which inventory station 50 may receive inventory items from inventory holders 30. In such embodiments, mobile drive units 20 may transport inventory holders 30 to those locations in parallel. After the inventory station 50 receives needed inventory items from a given inventory holder 30, for example, one mobile drive unit 20 may move that inventory holder 30 away from inventory station 50. Then, another mobile drive unit 20 may transport a different inventory holder 30 to the location recently exited by the previous inventory holder 30.

Management module 15 may assign a task to inventory station 50 to complete all or part of order 40 for one or more inventory items. For example, management module 15 may assign a task to a user or to inventory station 50 identifying inventory items to be selected for an order 40. Management module 15 may also identify bins of inventory holders 30, inventory holder 32, and/or array 52 that are storing the inventory items needed for order 40. Thus, management module 15 may transmit various instructions to inventory station 50 to guide a user at inventory station 50 through the packing of a given order 40. After receiving an indication that all or part of order 40 is complete, management module 15 may assign a task to transport order 40 in order holder 34 to be stored for future delivery and/or shipped to a destination. In the case where order 40 is only partially completed, management module 15 may assign a task to transport order 40 to another inventory station 50 to receive additional inventory items.

Mobile drive units 20 represent any suitable combination of devices and components operable to move inventory holders 30, inventory holders 32, and/or order holders 34 within workspace 70. Mobile drive units 20 may be designed to couple, interface, dock or otherwise connect with inventory holders 30, inventory holders 32, and/or order holders 34. For example, mobile drive units 20 may be configured to move beneath a given inventory holder 30, inventory holder 32, and/or order holder 34 and lift the holder using a docking head or other appropriate coupling structure. Mobile drive units 20 may be capable of moving to any appropriate location within workspace 70. Mobile drive units 20 may include appropriate communication devices to communicate information to and from management module 15, other mobile drive units 20, and/or inventory stations 50. In some embodiments, mobile drive units 20 may communicate with management module 15 and/or other mobile drive units using Wi-Fi (IEEE 802.11), Bluetooth (IEEE 802.15), Infrared Data Association standards, or any other appropriate wireless communications protocol. Mobile drive units 20 may include appropriate sensors to detect fixed locations and/or other mobile drive units 20 within workspace 70. Mobile drive units 20 may thereby facilitate movement and/or avoid collisions. Mobile drive units 20 may communicate information to management module 15 to assist management module 15 in the management of inventory system 10. For example, mobile drive unit 20 may transmit its location relative to a fixed location within workspace 70 to management module 15. In some embodiments, mobile drive units 20 represent independent self-powered devices. Alternatively or in addition, mobile drive units 20 may represent multiple types of mobile drive units. Mobile drive units 20 in various embodiments may refer to any appropriate means of transporting inventory items to locations within inventory system 10. For example, mobile drive units may refer to conveyance systems that make use of conveyor belts, cranes, or other apparatus to move inventory items and/or inventory holders 30 within inventory system 10.

Inventory holders 30 store inventory items. In some embodiments, inventory holders 30 include multiple storage bins each capable of holding one or more inventory items. Alternatively or in addition, inventory holders 30 may include a rack of shelves, each shelf capable of carrying one or more inventory items. Inventory holders 30 are capable of coupling and/or docking with mobile drive units 20 and being carried, rolled or otherwise moved by mobile drive units 20. Inventory holder 30 may include a plurality of faces. Each bin of inventory holder 30 may be accessible through one or more faces of the inventory holder 30. For example, in some embodiments, inventory holder 30 may include four faces, mobile drive unit 20 may be operable to rotate inventory holder 30 at appropriate times within workspace 70 to present a particular face containing the inventory items needed at an inventory station 50.

Inventory holders 32 also store inventory items. Inventory holders 32 are assigned to a location at inventory station 50 to remain stationary while orders are filled. Accordingly, inventory items in inventory holders 32 are available for order 40 while inventory items are received from inventory holders 30 in queue 60. In some embodiments, inventory holders 32 are substantially similar to inventory holders 30. For example, in some embodiments, inventory holders 30 may merely be designated as inventory holders 32 by management module 15. In some embodiments, a given inventory holder 32 may be assigned to inventory station 50 based on the product velocity of one or more inventory items stored in the inventory holder 32. Accordingly, inventory items in inventory holders 32 at inventory station 50 may be used to fill multiple orders 40. Inventory holders 32 may carry a number of inventory items that are the same and/or that may have a characteristic in common. For example, a characteristic in common may be that each inventory item has been assigned a discounted price in a given time period. Another characteristic in common may be that each inventory item is associated with a certain time of year, such as a holiday period. One other characteristic in common may be that each inventory item is frequently purchased by a subset of customers in orders 40.

Order holders 34 store orders 40. For example, order holders 34 may represent various pallets, bins, receptacles, tables, conveyors, and/or other structures capable of holding and/or storing orders 40. In some embodiments, order holders 34 may be an inventory holder 30 or 32 that is designated to store orders 40. Order holders 34 may store orders 40 until those orders are ready to be shipped. In some embodiments, order holders 34 may themselves be loaded for shipment. For example, order holders 34 may be shipping containers, pallets, or other receptacles suitable for shipment. Order holders 34 may simply hold orders 40 until those orders are ready to be removed from order holders 34 for shipment. Alternatively or in addition, order holders 34 may store orders received by inventory system 10 that may be filled from inventory holders 30, array 52, and/or inventory holders 32 at inventory station 50. In some embodiments, order holders 34 are substantially similar to inventory holders 30. For example, in some embodiments, inventory holders 30 may be designated as order holders 34 by management module 15. Moreover, a particular component may at different times serve as an inventory holder 30, inventory holder 32, and/or order holder 34. In some embodiments, a component may serve simultaneously as both an inventory holder 30 and an order holder 34 by storing both inventory items and orders 40. In some embodiments, order holders 34 may be capable of storing, holding and/or enclosing shipping containers such as boxes, pallets, or other shipping containers in which orders can be delivered to a given destination. In some embodiments, order holders 34 may not include bins or partitions and may instead hold only a single order 40 or group of orders 40 that are stored in mass. For example, order holder 34 may support, include or represent a pallet in which one or more orders are stored. Moreover, in particular embodiments, order holder 34 may represent a shipping container on or in which stored orders 40 may be shipped.

Orders 40 each represent a collection of one or more inventory items. In some embodiments, management module 15 may receive an order representing a customer request for various inventory items. In some embodiments, management module 15 may manage multiple orders 40 within inventory system 10. Orders 40 may be assembled at inventory stations 50 using inventory items transported to inventory station 50 by mobile drive units 20. For example, order 40 may be assembled from inventory items stored in various inventory holders 30, array 52, and/or inventory holders 32. Orders 40, as used herein, may represent all or part of an actual customer order. For example, a customer order may include various parts or portions, each including multiple inventory items. Order 40 may refer to one or more of those parts or portions.

Inventory stations 50 represent locations within workspace 70 designated for the completion of particular tasks involving inventory items. Such tasks may include the removal of inventory items from inventory holders 30 and/or inventory holders 32, the introduction of inventory items into inventory holders 30 and/or inventory holders 32, and/or the counting of inventory items in inventory holders 30 and/or inventory holders 32. In some embodiments, tasks include the introduction to, removal from, and/or counting of inventory items in array 52. In some embodiments, tasks may include the decomposition of inventory items for pallet or case-sized groups and/or may include assembling orders 40 for shipment on or storage on order holders 34. Alternatively or in addition, tasks performed at inventory station 50 may involve processing or handling inventory items and other suitable functions. For example, individual orders 40 may be built and/or packed for shipment. As another example, manufactured products may be built and/or assembled from individual parts. In some embodiments, inventory stations 50 may simply represent physical locations within workspace 70 where a particular task involving inventory items may be completed. In alternative embodiments, inventory stations 50 may represent the physical location and equipment for processing or handling inventory items. Such equipment may include, for example, scanners for monitoring the flow of inventory items in and out of inventory system 10. Inventory stations 50 may include communication interfaces for communicating with management module 15. In some embodiments, inventory stations 50 may include displays and/or other human machine interfaces. For example, inventory stations 50 may include displays for communicating tasks and other information to and from a worker or inventory manager at inventory station 50. Inventory stations 50 may be controlled by human operators or may be fully automated. Human or automated operators at inventory stations 50 may be capable of performing certain tasks involving inventory items such as packing or counting inventory items. As depicted, certain inventory stations 50 may be capable of interfacing with inventory holders 30 arranged in a queue 60 and/or interfacing with inventory holders 32 at inventory station 50. In addition or in the alternative, inventory station 50 may include an array 52 of inventory holders, which may store various inventory items. Inventory stations 50 may receive inventory items from inventory holders 32 and/or array 52 while inventory items are received from successive inventory holders 30.

Array 52 represents any suitable combination of bins, shelves, holders or other structures suitable to store multiple inventory items at inventory station 50. In some embodiments, array 52 may include one or more individually identifiable locations for storing inventory items. Accordingly, management module 15 may assign particular inventory items into particular locations of array 52. Management module 15 may assign inventory items to those locations based on product velocity and/or other factors, as discussed in more detail below. In addition, while inventory station 50 is illustrated as having a single array 52, inventory station 50 may have any number and combination of arrays 52.

Workspace 70 represents an area associated with inventory system 10 in which mobile drive units 20 may move and where inventory holders 30, inventory holders 32, and/or order holders 34 may be stored. Although the illustrated figure shows an embodiment of inventory system 10 in which the overall workspace 70 is a particular geometric pattern, various embodiments of inventory system 10 may include a workspace 70 that has variable dimensions or an arbitrary geometry. Accordingly, workspace 70 may be arranged in accordance with any appropriate geometry suitable for a given inventory system 10. For example, workspace 70 may have multiple levels in accordance with the particular geometries of a multi-level warehouse. As another example, workspace 70 may be arranged taking into account particular features of an irregularly-shaped warehouse and/or shipping zone. As yet another example, workspace 70 may be arranged in accordance with a shipping dock and/or the deck of a cargo ship.

As a result, while particular embodiments of inventory system 10 are illustrated, it should be appreciated that the teaching of the present disclosure may be applied to any type and number of inventory systems. For example, inventory system 10 may represent a mail order or e-commerce warehouse wherein individual orders 40 may be compiled at inventory stations 50 for shipment to individual customers. In particular embodiments, orders 40 may begin at an order induction inventory station 50. At that inventory station 50, order induction activities may take place. For instance, boxes or other receptacles operable to hold each order 40 may be assembled. Other materials may additionally or alternatively be placed into the boxes or other receptacles, such as packing materials and/or information related to orders 40 (such as packing slips and/or bills of lading). In some embodiments, inventory holders 32 and/or arrays 52 may be located at the order induction inventory station 50 such that inventory items may be used to at least partially fill orders 40 at order induction. The boxes and/or receptacles that hold or will hold inventory items associated with orders 40 may be loaded at that inventory station into order holders 34 and transported to another inventory station 50. At that inventory station 50, inventory items from inventory holders 30 and/or 32 may be added to each partially completed order 40 to complete each of the orders 40. In some embodiments, however, a partially completed order 40 may be transported to various inventory stations 50 to receive inventory items at those inventory stations before the order 40 is complete. Once completed, orders 40 may be returned to order holders 34 and/or may placed in another area suitable for shipment, such as on a shipping pallet or on a table or shelf. In some embodiments, shipping preparation activities may take place at particular inventory stations 50. At such inventory stations 50, various inventory items from inventory holders 30 and/or 32 may be added to the boxes and/or receptacles that hold order 40 prior to shipment.

As another example, inventory system 10 may represent a merchandise return facility. In such embodiments, inventory items may represent merchandise returned by customers. Such merchandise may be stored in inventory holders 30, inventory holders 32, and/or array 52 when received at the facility from individual customers. At appropriate times, large numbers of units may be removed from a particular inventory holder 30, inventory holder 32, and/or array 52 and transferred at inventory station 50 to an order holder 34. Inventory items with a high return rate may be stored in inventory holders 32 and/or 52. For example, certain inventory items may be associated with a product recall, causing those inventory items to be returned in high volume. As another example, inventory management system 10 may represent a manufacturing facility, and inventory items may represent individual components of a manufacturing kit. Thus, individual items of the manufacturing kit may be stored in inventory holders 30, inventory holders 32, and/or array 52. In some embodiments, partial assemblies and/or kits may be stored in array 52. Orders 40 for manufactured products may be assembled from the individual items at inventory stations 50. Items of the manufacturing kit that will be and/or are likely to be used multiple times during assembly may be stored in inventory holders 32 and/or array 52. Final products may be transported by mobile drive units 20 using order holders 34 and may be shipped to the appropriate destination. Thus, although a number of example embodiments are described in the present disclosure, inventory system 10 may, in general, represent any suitable facility or system for storing or processing inventory items, and inventory items may represent objects of any type suitable for storage, retrieval and/or processing in a particular inventory system 10.

In operation, the various components of inventory system 10 complete tasks associated with the fulfillment of orders 40 received and/or generated by inventory system 10. Management module 15 facilitates the scheduling and/or coordination of tasks within system 10. For example, management module 15 may assign tasks to various mobile drive units 20 to transport various inventory holders 30 and/or inventory holder 32 to inventory station 50 in order to facilitate the fulfillment of orders. Management module 15 may, in some embodiments, assign tasks for mobile drive units 20 to transport order holder 34 to various locations within workspace 70. Mobile drive units 20 may receive tasks from management module 15. Mobile drive units 20, for example, may receive tasks to travel to various locations within inventory system 10. Mobile drive units 20 may additionally or alternatively be assigned tasks to interact with inventory holders 30, 32, and/or inventory stations 50. For example, mobile drive units 20 may be assigned one or more tasks to travel to a location of an inventory holder 30 or 32, transport inventory holder 30 or 32 to an inventory station 50, then undock from inventory holder 30 or 32, and/or move away from inventory station 50 holding inventory holder 30 or 32.

Management module 15 determines the product velocity of various inventory items within system 10. Management module 15 may determine product velocity based on analyzing orders 40 within inventory system 10 and/or other information. Management module 15 may determine one or more inventory items in inventory system 10 with relatively higher product velocity than other inventory items in inventory system 10. Additionally or alternatively, management module 15 may determine the frequencies of orders requiring inventory items within system 10. Management module 15 may then determine one or more inventory items with relatively higher frequencies of orders. In some embodiments, management module 15 may additionally or alternatively determine the average product velocity of inventory holders 30 and/or 32 based on the product velocity of inventory items stored in each inventory holder 30 and/or 32. Management module 15 may accordingly determine relative average product velocities of inventory holders 30 and/or 32. Thus, management module 15 may select inventory holders 30 and/or 32 with higher relative average product velocities than other inventory holders 30 and/or 32.

Management module 15 may designate and/or assign inventory holders 32 to inventory station 50. Management module 15 may assign inventory holders 32 based on minimizing the cost of transporting inventory items within inventory holders 30 to inventory station 50, where cost may be based on the number of tasks, travel distance, and/or time required by mobile drive units 20 and/or other components of inventory system 10. In some embodiments, the designation and/or assignment may be based on determining that inventory holder 32 is or is likely to hold inventory items required by a plurality of orders 40 within inventory system 10. For example, management module 15 may designate and/or assign inventory holder 32 to inventory station 50 based on the product velocity of one or more inventory items and/or the frequency of orders receiving one or more inventory items within that inventory holder 32. In some embodiments, management module 15 may base the determination on the total number of each inventory items held by each inventory holder 30 and/or 32 as well as the product velocity of those inventory items. As an illustration, management module 15 may designate and/or assign an inventory holder 32 to inventory station 50 that holds ten of the second-highest velocity inventory items over an inventory holder 30 that merely holds one of the highest velocity inventory items. Accordingly, management module 15 may assign and/or designate inventory holder 32 based on product velocity and number of inventory items within inventory holders 30 and/or 32.

In some embodiments, the designation and/or assignment may be based on inventory items located at other inventory stations 50, based on attributes of inventory station 50, based on attributes of an operator at inventory station 50, or based on other predictive measures. For example, one inventory station 50 may require a substantial number of a certain inventory item stored by an inventory holder 32 at that inventory station 50 to complete orders 40. Meanwhile, a second inventory station 50 may also require a number of those inventory items for orders 40. Management module 15 may accordingly determine to move inventory holder 32 to the second inventory station 50 so that a number of those inventory items may be stored in array 52 at the second inventory station 50. Management module 15 may determine to then move inventory holder 32 back to the first inventory station 50. Accordingly, management module 15 may assign inventory holders 32 and/or inventory items to arrays 52 such that utilization of components of inventory system 10, such as mobile drive units 20, is minimized, or the performance of the human operators is maximized.

In some embodiments, management module 15 may assign inventory holder 32 to a fixed location at inventory station 50. Alternatively or in addition, management module 15 may assign a task to transport inventory holder 32 to inventory station 50. Based on a task assignment, a mobile drive unit 20 may transport inventory holder 32 to inventory station 50. Inventory holders 32 may be assigned to inventory station 50 independently of a given order 40. As the orders 40 within inventory system 10 change over time, management module 15 may be operable to continuously determine the product velocity of inventory items within system 10. Thus, when another inventory item is determined to have a higher product velocity than the inventory item in inventory holder 32, management module 15 may assign and/or designate another inventory holder 32 to inventory station 50.

Management module 15 may also assign and/or designate inventory items for array 52 based on determining that those inventory items are or are likely to be required by a plurality of orders 40. Management module 15 may assign inventory items to array 52 based on minimizing the cost of transporting those inventory items to inventory station 50, where cost may be based on the number of tasks and/or time required by mobile drive units 20 and/or other components of inventory system 10. In some embodiments, management module 15 may assign those inventory items to array 52 based on the product velocity of one or more inventory items and/or the frequency of orders receiving one or more inventory items. Management module 15 may additionally or alternatively assign inventory items to array 52 based on inventory items that fit within array 52 and/or on the number of inventory items that each bin and/or receptacle within array 52 is capable of holding. Management module 15 may accordingly sometimes select an inventory item with a relatively lower product velocity based on determining that array 52 will hold a greater number of that item than a different inventory item that has a relatively higher product velocity. As an illustration, in an embodiment in which array 52 includes five storage bins, management module 15 may assign five inventory items with the five highest product velocities to the spaces in array 52. However, management module 15 may determine to select the sixth highest product velocity item based on determining that one or more of the highest five velocity inventory items will not fit in a receptacle of array 52. Alternatively, management module 15 may determine to select the sixth highest product velocity item based on determining that, for instance, array 52 is operable to receive ten of that item based on the item's size, but array 52 is only operable to receive one of the highest product velocity item based on its size.

Management module 15 may assign tasks to various mobile drive units 20 to transport the inventory holders 30 storing the assigned inventory items to inventory station 50. Accordingly, inventory station 50 may receive the assigned inventory items, and/or may cause those items to be moved into array 52. When another inventory item is determined to have a higher product velocity than one or more inventory items in array 52, management module 15 may assign a task to replace the inventory item in array 52 with the inventory item having the higher product velocity. This may include, for example, assigning a task to transport an inventory holder 30 to inventory station 50 to store the inventory item after its removal from array 52. A task may also be assigned to transport inventory holder 30 storing the inventory item having the higher product velocity to inventory station 50 for receipt into array 52. In some embodiments, the inventory holder 30 having the higher product velocity may be used to store the inventory item after its removal from array 52. Thus, the inventory item in array 52 may be replaced using a single inventory holder 30.

Inventory station 50 may receive a first inventory item from inventory holder 30 for order 40 at a location at inventory station 50 and may receive a second inventory item for order 40 from another inventory holder 30 at the same location once the first inventory holder 30 is transported away and the second inventory holder advances in queue 60 to the first location. While orders are fulfilled, inventory holder 32 may be located at another location at inventory station 50 and may provide inventory items while the inventory items from the first and second inventory holders 30 are being received. In some embodiments, inventory station 50 may receive inventory items into array 52 from inventory holders 30 that are transported to inventory station 50 by mobile drive units 20. In order to fulfill a given order 40, inventory station 50 may receive an inventory item responsive to order 40 from inventory holders 30 transported to inventory station 50 by mobile drive units 20. Inventory station 50 may also receive inventory items from inventory holder 32 and/or array 52 in order to fulfill order 40. Inventory station 50 and/or a user of inventory station 50 may receive inventory items from the various inventory holders 30, inventory holder 32, and/or array 52 and may assemble order 40 for delivery to an order holder 34. It should be noted, however, that while the illustrated embodiment depicts order 40 as being delivered to order holder 34, order 40 may be delivered to any appropriate destination, including a pallet, conveyor, and/or table. Thus, order 40 may be shipped to a given destination and/or placed in storage for future delivery.

Management module 15 may assign various tasks to components of inventory system 10 to complete orders 40. In some embodiments, management module 15 may assign tasks for various mobile drive units 20 to transport inventory holders 30 to inventory stations 50 so that inventory items stored within those inventory holders 30 may be used to complete orders 40. In some embodiments, inventory system 10 may include various inventory stations 50, with each inventory station 50 associated with one or more inventory holders 32 and/or array 52. Management module 15 may thus determine an appropriate inventory station 50 at which to complete each order 40 based on the inventory items stored at each inventory station 50. For example, management module 15 may choose an inventory station 50 that has one or more inventory items stationed in inventory holders 32 and/or array 52. By way of illustration, in an embodiment where inventory system 10 is a retail warehouse, one inventory station 50 may be associated with inventory holders 32 and/or arrays 52 holding high velocity books while other inventory stations 50 may be associated with inventory holders 32 and/or arrays 52 holding other high velocity media. Based on determining that a given order 40 includes high velocity books, management module may assign that order 40 to the first inventory station 50 for completion. It should be understood that while a specific example of inventory items was used in the preceding illustration, that the present disclosure applies to any number and types of inventory items. It should be understood, however, that utilizing the teachings of the present disclosure, management module 15 may assign any number and combination of inventory holders 32 to various inventory stations 50. In addition, management module 15 may assign inventory items to any number and combination of arrays 52. In particular embodiments, inventory stations 50 may utilize both inventory holders 32 and arrays 52 to complete orders 40. Additionally or in the alternative, various embodiments of inventory stations 50 may process orders using solely inventory holders 32 and/or arrays 52.

Moreover, while an example embodiment of operation has been explained with respect to illustrations in FIG. 1, it should be understood that the concepts of the present disclosure may be applied to any number and types of situations in which orders are fulfilled and/or processed. More specific examples of how orders may be fulfilled using the teachings of the present disclosure explained in more detail below with respect to FIGS. 2A-2D.

FIGS. 2A to 2D are diagrams illustrating example embodiments of operation of an inventory system 10.

As illustrated in FIG. 2A, an order 40 is fulfilled with inventory items from inventory holders 30a, 30b, 30c, and 32. Inventory holders 30a, 30b, and 30c each carry inventory items to inventory station 50 via a queue 60. Inventory holders 30a, 30b, and 30c are transported to inventory station 50 by mobile drive units 20. Inventory holders 30 may be carrying inventory items needed to complete an order 40. In some embodiments, mobile drive units 20 may carry each inventory holder 30 to inventory station 50 in response to a task assignment from management module 15. As each inventory holder 30 reaches an interface location at inventory station 50, an inventory item needed by order 40 may be received by inventory station 50. While the items from inventory holders 30 are received, inventory holder 32 remains stationary at a location at inventory station 50. Inventory holder 32 may be selected for the location at inventory station 50, for example, by management module 15 based on the product velocity of inventory items held by the particular inventory holder 32. Accordingly, inventory holder 32 is selected independently of a given order 40. Thus, an order 40 may be fulfilled at inventory station 50 with items from inventory holders 30a, 30b, 30c, and 32.

As illustrated in FIG. 2B, inventory holder 32a may be replaced by inventory holder 32b. For example, management module 15 may determine that an inventory item held by inventory holder 32b has a higher product velocity than inventory items held by inventory holder 32a. Accordingly, management module 15 may assign inventory holder 32b to remain stationary at inventory station 50 at the location previously held by inventory holder 32a. In some embodiments, inventory items remaining in inventory holder 32a may be removed and/or returned to inventory holder 30a, 30b, and/or 30c. Accordingly, those inventory items may be returned to storage or other appropriate destination. In some embodiments, however, inventory holder 32a may simply be returned to a location within workspace 70 without removing inventory items from its content. Additionally or alternatively, inventory holder 32a may be supplemented by inventory holder 32b and both may remain stationary at inventory station 50 at the same time at two locations at inventory station 50. Thus, two or more inventory holders 32 may be designated to remain stationary at inventory station 50 and accordingly may be available to each provide inventory items for orders 40.

As illustrated in FIG. 2C, array 52 is first filled with inventory items and order 40 is then fulfilled using inventory items from inventory holders 30a, 30b, 30c, and array 52. Inventory items are first received at inventory station 50 for introduction into array 52. As, illustrated, those inventory items are transported to the inventory station by inventory holder 32. Alternatively or in addition, such inventory items may be transported to inventory station by inventory holders 30. Inventory items may be assigned to locations in array 52, for example, by management module 15 based on product velocity. Second, an order 40 is processed for fulfillment at inventory station 50. Items from inventory holders 30a, 30b, 30c, and array 52 are received at inventory station 50 in order to fulfill order 40. In addition or in the alternative, inventory holder 32 may include additional inventory items with relatively high product velocities, such that inventory holders 32 and array 52 may be utilized in the same embodiment. In addition, inventory station 50 may support any number and combination of inventory holders 32 and arrays 52 as appropriate.

As illustrated in FIG. 2D, inventory items in array 52 are replaced by other inventory items. Management module 15 may, for example, determine that one or more other inventory items have a higher product velocity than one or more of those currently in array 52. Accordingly, the inventory items in array 52 may be moved to inventory holder 30a and/or 30b, and inventory holder 30c may carry replacement inventory items to inventory station 50. Alternatively, replacement inventory items from inventory holder 30a and/or 30b may be received into array 52 and items being replaced may be moved to those same inventory holders. While inventory holders 30 are illustrated, it should be understood that items removed from array 52 may be moved to inventory holders 32 and inventory holders 32 may similarly transport the replacement inventory items.

While FIGS. 2A to 2D describe several specific scenarios for facilitating the fulfillment of orders 40 using inventory holders 30, 32, and/or arrays 52, the present disclosure is intended to encompass any number and combinations of inventory holders 30, 32, and/or arrays 52 being utilized to fulfill various orders 40.

Figure 3:
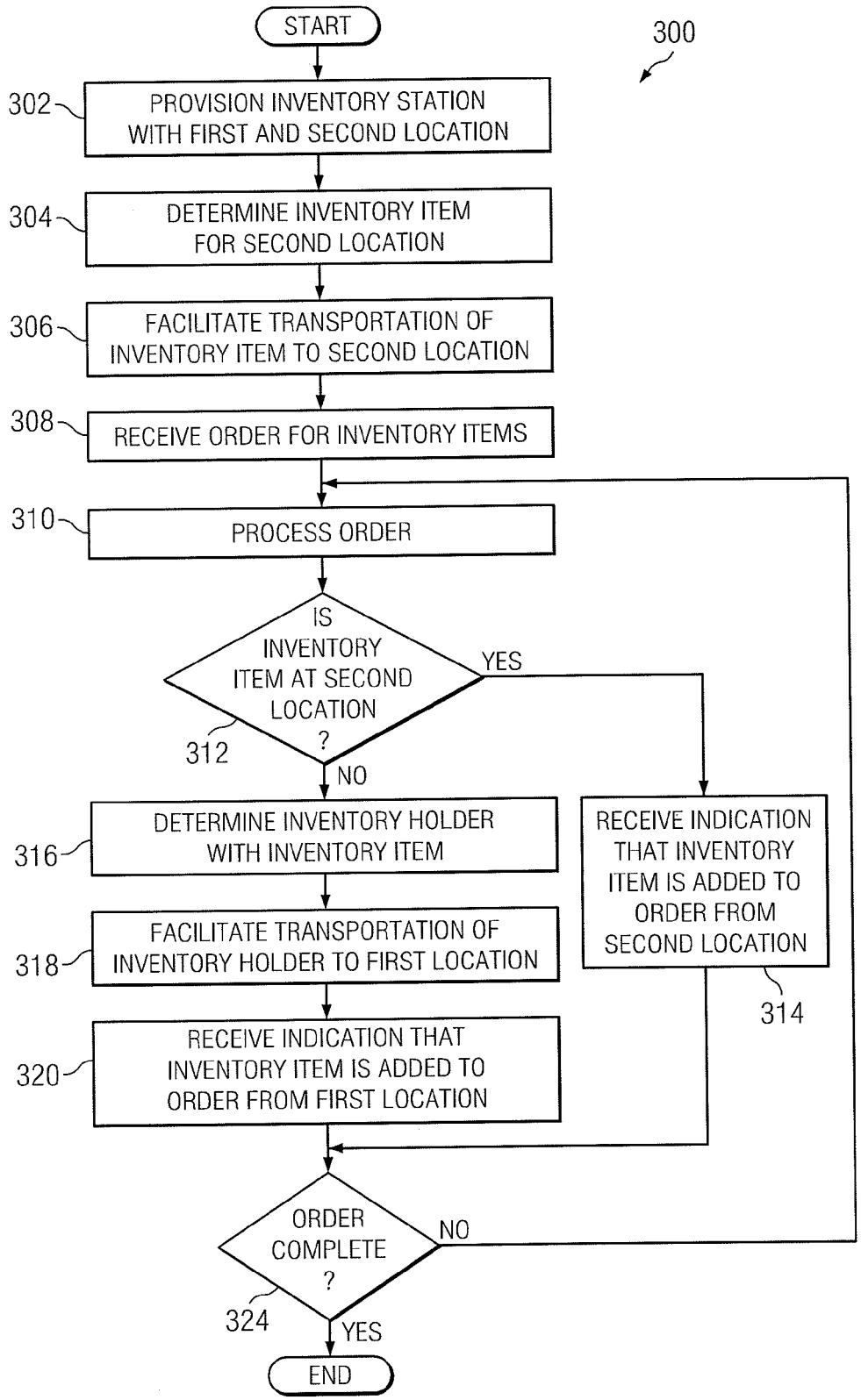
FIG. 3 is a flowchart illustrating an example embodiment of method for fulfilling an order in an inventory system.

FIG. 3 is a flowchart illustrating an example embodiment of method 300 for fulfilling an order in an inventory system 10. At step 302, an inventory station 50 is provisioned with first and second locations. First locations may be associated with queue 60 and may provide an interface to receive items from inventory holders 30 transported to inventory station 50 by mobile drive units 20. The second location may be designated for an inventory holder 32 to remain stationary while orders 40 are being fulfilled.

At step 304, an inventory item for the second location is determined. For example, management module 15 may determine that a given inventory item in inventory system 10 has a higher product velocity than other inventory items and/or may determine that an inventory item is required by a higher frequency of orders 40 than other inventory items. Accordingly, management module 15 may assign and/or designate an inventory holder 32 to remain at the second location while orders 40 are being fulfilled.

At step 306, management module 15 facilitates the transportation to the second location of the inventory holder 32 holding the inventory item determined by management module 15. In some embodiments, inventory holder 32 is transported to the second location by a mobile drive unit 20. Inventory holder 32 will remain at the second location for so long as that inventory item remains designated by management module 15. If, however, management module 15 determines another inventory item to have a higher product velocity than the inventory item currently at inventory station 50, management module 15 may assign a task to replace inventory holder 32 holding the current inventory item with the new inventory item. Management module 15 may additionally or alternatively determine that a quantity of inventory items in inventory holder 32 has fallen below a threshold. For instance, management module 15 may determine that the quantity of inventory items in inventory holder 32 is "low" or "empty." In response, management module 15 may assign a task to transport an additional quantity of that inventory item to inventory station 50 via a given inventory holder 30. In some embodiments, management module 15 may assign a task for a second inventory holder 32 holding an additional quantity of that inventory item to replace inventory holder 32 currently at inventory station 50.

At step 308, order 40 is received and/or generated by system 10 for various inventory items within system 10. Management module 15 may at step 310 begin to process orders 40 within system 10. For example, management module 15 may process orders 40 by assigning various tasks to the components of system 10 to complete order 40. Management module 15 may determine that one or more inventory holders 30 carry various inventory items required by order 40.

Accordingly, at step 312, management module 15 may determine whether any inventory items on order 40 are already located at the second location of inventory station 50. If the inventory item is already at the second location at inventory station 50, then the inventory item is received from inventory holder 32 at the second location. At step 314, management module 15 may then receive an indication that the inventory item is added to order 40 from the second location. For example, inventory station 50 and/or a worker at inventory station 50 may transmit a status update or other indication that the inventory item is added to order 40. If the inventory item on order 40 is not located at the second location, then at step 316, management module 15 may determine which inventory holder 30 within inventory system 10 holds the item. In some embodiments, multiple inventory holders 30 may hold the inventory item required by order 40. Management module 15 may accordingly determine the most efficient route and/or closest inventory holder 30 containing that inventory item.

At step 318, management module 15 facilitates the transportation to the first location of the inventory holder 30 that holds the required inventory item by mobile drive unit 20. For example, the first location may be an interface of inventory station 50 with the first inventory holder 30 in queue 60. When inventory holder 30 reaches the first location, the inventory item may be received from inventory holder 30 into inventory station 50. At step 320, management module 15 may then receive an indication that the inventory item is added to order 40 from the first location. For example, inventory station 50 and/or a worker at inventory station 50 may transmit a status update or other indication that the inventory item is added to order 40. If at step 324, order 40 is not complete, then method 300 continues processing order 40 at step 312 until order 40 is complete. If order 40 is complete, the method ends. In some embodiments, however, the method may return to step 310 so that another order 40 can be processed.

It should be noted, however, that method 300 is merely illustrated as an example. Modifications, additions, or omissions may be made to method 300 illustrated in the flowchart of FIG. 3. For example, management module 15 is capable of assigning many tasks at once and/or in parallel. Thus, management module 15 may also process many orders in parallel and/or in sequence. Additionally, the steps of FIG. 3 may be performed in parallel or in any suitable order. Moreover, while FIG. 3 has been described with respect to an embodiment having two locations, it is envisioned that the teachings of the present disclosure may encompass inventory stations having any number and combinations of locations, including multiple locations for inventory holders 30 and/or multiple locations for inventory holders 32.

Figure 4:
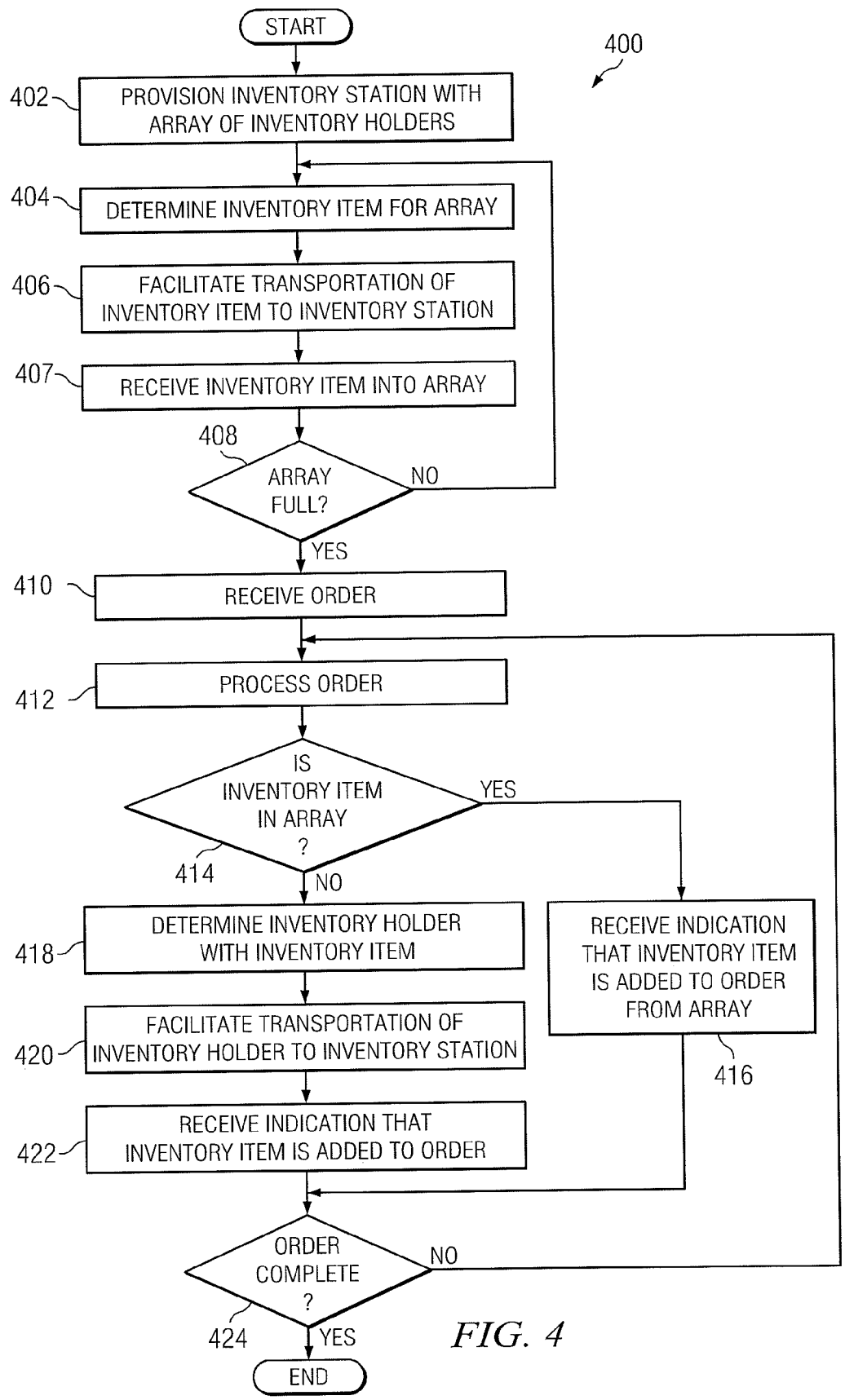
FIG. 4 is a flowchart illustrating another example embodiment of method for fulfilling an order in an inventory system.

FIG. 4 is flowchart illustrating another example embodiment of method 400 for fulfilling an order 40 in inventory system 10. At step 402, an inventory station 50 is provisioned with an array 52 of inventory holders. At step 404, an inventory item for array 52 may be determined. For example, management module 15 may determine an number of inventory items corresponding to the number of inventory holders in array 52 that have the highest product velocity in inventory system 10. Management module 15 may thus assign those inventory items to the inventory holders in array 52 based on their relative product velocities.

At step 406, management module 15 facilitates the transportation to inventory station 50 of the inventory items assigned to array 52. The inventory items, may for example, be transported to inventory station 50 by mobile drive units 20. At step 407, those inventory items are received by inventory station 50 for introduction into array 52. If array 52 is determined to be full at step 408, the management module 15 may proceed to step 410. If array 52 is not full, then the method returns to step 404 to determine another inventory item to assign to array 52. For example, management module 15 may determine an inventory item with the next highest product velocity. Management module 15 may thus continue to assign inventory items to array 52 until a number of inventory items have been assigned corresponding to the number of inventory holders in array 52. It should be noted, however, that while step 408 of the illustrated example embodiment of operation depicts a determination of whether array 52 is full, array 52 need not be full prior to processing order 40. In some embodiments, management module 15 may determine, prior to filling array 52, that inventory system 10 does not have enough inventory items with the appropriate criteria to be introduced into array 52. For example, various inventory items may have approximately the same product velocity and/or inventory items with high product velocity may be scarce and/or too large to fit into array 52.

After array 52 is determined to be full at step 408, orders may be received and/or generated within inventory system 10 at step 410. Order 40 is processed at step 412. Management module 15 may, for example, assign tasks to the various components of inventory system 10 to process order 40. At step 414, management module 15 may determine whether an inventory item on order 40 is in array 52. If it an inventory items is in array 52, then that inventory item may be received from array 52 into inventory station 50. At step 416, management module 15 may then receive an indication that the inventory item is added to order 40 from array 52. For example, inventory station 50 and/or a worker at inventory station 50 may transmit a status update or other indication that the inventory item is added to order 40.

If the inventory item is not in array 52 at step 414, management module 15 may then, at step 418, then determine which inventory holder 30 within inventory system 10 holds the item. In some embodiments, multiple inventory holders 30 may hold the inventory item required by order 40. Management module 15 may accordingly determine the most efficient route and/or closest inventory holder 30 containing that inventory item. Once the inventory holder 30 holding that inventory item is determined, then management module 15 may issue a task for a mobile drive unit 20 to transport that inventory holder 30 to inventory station 50.

At step 420, management module 15 facilitates the transportation to inventory station 50 of the inventory holder 30 that holds the required inventory item may be transported by mobile drive unit 20. When inventory holder 30 reaches inventory station 50, the inventory item may be received from inventory holder 30 into inventory station 50. At step 422, management module 15 may receive an indication that the inventory item is added to order 40. For example, inventory station 50 and/or a worker at inventory station 50 may transmit a status update or other indication that the inventory item is added to order 40. If at step 424, order 40 is not complete, then method 400 continues processing order 40 at step 412 until order 40 is complete. If order 40 is complete, method 400 ends.

Technical advantages of certain embodiments include the ability to provide an inventory system with an inventory station operable to receive inventory items from various inventory holders. Another technical advantage may include the ability to keep an inventory holder at an inventory station containing certain inventory items while other inventory holders carry other inventory items to the inventory station. The inventory items in the stationary inventory holder may be determined based on a product velocity, which may be higher than other inventory items. Thus, inventory items with a relatively high product velocity may be available at the inventory station to fill orders while other inventory items are received at the station by inventory holders transported by mobile drive units. Another technical advantage may be the ability to use the relative product velocities of inventory items, which may allow the inventory items that remain stationary at the inventory station to be changed based on changes in product velocity. One other technical advantage may include the ability to fill an order from a combination of dynamically arriving inventory items arriving on inventory holders via mobile drive units and stationary inventory. The static stationary inventory may be located in an inventory holder capable of being transported by mobile drive units and/or may be located in a fixed array of inventory holders. Moving inventory from a mobile inventory holder to a fixed array of inventory holders may allow the mobile inventory holder to be repurposed for other tasks. Inventory stations may use a combination of stationary inventory holders, fixed arrays of inventory holders, and dynamic inventory holders. In addition, particular embodiments may use any number of stationary inventory holders and arrays and/or may use inventory holders of varying dimensions and load carrying abilities. Moreover, stationary inventory holders at inventory stations may be replaced with other stationary inventory holders that can be dynamically replaced as appropriate. Likewise, inventory items may be dynamically removed from the fixed array of inventory holders and/or replaced with other inventory items as appropriate. Accordingly, the efficiency of the inventory system may increase. It should be noted, however, that method 400 is merely illustrated as an example. Modifications, additions, or omissions may be made to method 400 illustrated in the flowchart of FIG. 4. For example, management module 15 is capable of assigning many tasks at once and/or in parallel. Thus, management module 15 may also process many orders in parallel and/or in sequence. Additionally, the steps of FIG. 4 may be performed in parallel or in any suitable order. Moreover, the embodiments described with respect to FIGS. 3 and 4 are expected be fully combinable. It is therefore envisioned that various embodiments may include locations for various inventory holders 32 and arrays 52 at the same time. Management module 15 may thus be capable of determining the optimal location for various inventory items within inventory holders 30, 32, arrays 52, and/or various inventory stations 50.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims. Moreover, while the present disclosure has been described with respect to various embodiments, it is fully expected that the teachings of the present disclosure may be combined in a single embodiment as appropriate.

What is claimed is:

1. A system, comprising:
    a first mobile drive unit and a second mobile drive unit;
    a first inventory holder, a second inventory holder, and a third inventory holder; and
    an inventory station comprising a first location and a second location, the inventory station operable to:
        receive a first inventory item from the first inventory holder at the first location, wherein the first location comprises a first space of a queue designated for inventory item processing, the first inventory holder transported by the first mobile drive unit;
        receive a second inventory item from the second inventory holder at the first location, the second inventory holder transported by the second mobile drive unit; and
        receive a third inventory item from the third inventory holder at the second location, wherein the second location is designated for storing one or more inventory items associated with a product velocity and wherein the third inventory holder is fixed at the second location while the inventory station receives the first inventory item and the second inventory item.

2. The system of claim 1, wherein the third inventory holder is transported to the second location by a third mobile drive unit.

3. The system of claim 1, wherein,
    the first inventory holder and the second inventory holder are transported to the first location in response to an order; and
    the third inventory holder is transported to the second location in response to a plurality of orders.

4. The system of claim 3, wherein the third inventory holder is transported to the second location in response to a product velocity of the third inventory item.

5. The system of claim 3, wherein the third inventory holder is transported to the second location in response to a product velocity of a plurality of inventory items in the third inventory holder.

6. The system of claim 4, wherein the product velocity is determined based on at least one of past order information, known demand, and predicted future order information.

7. The system of claim 1, further comprising a management module operable to:
    determine the third inventory item based on a frequency of a plurality of orders receiving the third inventory item; and
    assign the third inventory holder to the second location based on the frequency.

8. The system of claim 7, wherein determining the third inventory item further comprises determining that the frequency of orders receiving the third inventory item is higher than frequencies of orders receiving the first inventory item and orders receiving the second inventory item.

9. The system of claim 1, further comprising a management module operable to assign a fourth inventory holder holding a fourth inventory item to the second location.

10. The system of claim 9, the management module further operable to determine that a frequency of a plurality of orders receiving the third inventory item is less than a second frequency of orders receiving the fourth inventory item before assigning the fourth inventory holder to the second location.

11. The system of claim 9, the management module further operable to assign a task to move the third inventory item to a fifth inventory holder transported to the first location by a fifth mobile drive unit.

12. The system of claim 1, the system further comprising a management module operable to:
    determine that a quantity of the third inventory item at the second location is lower than a threshold; and
    assign a task to transport an additional quantity of the third inventory item to the first location.

13. The system of claim 1, the inventory station further comprising an array of inventory holders operable to receive inventory items.

14. The system of claim 1, further comprising a fourth inventory holder, wherein the inventory station further comprises a third location, and the inventory station is further operable to receive a fourth inventory item from the fourth inventory holder at the third location, wherein the fourth inventory holder is fixed at the third location while the inventory station receives the first inventory item, the second inventory item, and the third inventory item.

15. A system, comprising:
    a first mobile drive unit; a second mobile drive unit, and a third mobile drive unit;
    a first inventory holder, a second inventory holder, and a third inventory holder; and
    an inventory station comprising an array of inventory holders, wherein the array of inventory holders are associated with a plurality of product velocities, the inventory station operable to:

receive a first inventory item into the array from the first inventory holder, wherein the first inventory item is received into the array based upon a product velocity associated with the first inventory item, the first inventory holder transported to the inventory station by the first mobile drive unit;

receive a second inventory item from the second inventory holder, the second inventory holder transported to the inventory station by the second mobile drive unit;

receive a third inventory item from the third inventory holder, the third inventory holder transported to the inventory station by the third mobile drive unit; and receive the first inventory item from the array.

16. The system of claim 15, the inventory station further comprising a first location and a second location, wherein the first inventory holder, the second inventory holder, and the third inventory holder are received at the first location while a fourth inventory holder is fixed at the second location.

17. The system of claim 15, wherein the first inventory holder comprises a plurality of inventory items and the inventory station is operable to receive the plurality of inventory items into the array of inventory holders.

18. The system of claim 15, wherein the first inventory holder is transported to the inventory station in response to a plurality of orders, the second inventory holder and the third inventory holder are transported to the inventory station in response to the order, and the first inventory item is received from the array in response to the order.

19. The system of claim 18, wherein the first inventory holder is transported to the inventory station in response to a product velocity of the first inventory item.

20. The system of claim 19, wherein the product velocity is determined based on at least one of past order information, known demand, and predicted future order information.

21. The system of claim 15, further comprising a management module operable to:
determine the first inventory item based on a frequency of a plurality of orders receiving the first inventory item; and
assign the first inventory item to the array based on the frequency.

22. The system of claim 21, wherein determining the first inventory item further comprises determining that the frequency of orders receiving the first inventory item is higher than frequencies of orders receiving the second inventory item and orders receiving the third inventory item.

23. The system of claim 21, the management module further operable to determine the first inventory item further based on determining a number of the first inventory item that the array of inventory holders is operable to receive, the number based on a size of the first inventory item.

24. The system of claim 15, further comprising a management module operable to:
determine that a frequency of a plurality of orders receiving the first inventory item is less than a second frequency of orders receiving a fourth inventory item; and
assign a fourth inventory holder holding the fourth inventory item to transport the fourth inventory item to the inventory station; and
wherein the inventory station is further operable to receive the fourth inventory item into the array.

25. The system of claim 24, the management module further operable to assign a task to move the first inventory item to the fourth inventory holder.

26. The system of claim 24, the management module further operable to assign a task to move the first inventory item to a fifth inventory holder transported to the inventory station by a fifth mobile drive unit.

27. The system of claim 15, the management module further operable to:
determine that a quantity of the first inventory item in the array is lower than a threshold; and
assign a task to transport an additional quantity of the first inventory item to the inventory station.

28. The system of claim 15, the inventory station further operable to receive a fourth inventory item from a fourth inventory holder at the inventory station, wherein the fourth inventory holder is fixed at the inventory station while the inventory station receives the second inventory item and the third inventory item.

29. A method, comprising:
receiving, at an inventory station, an order for a first inventory item, a second inventory item, and a third inventory item;
receiving the first inventory item from a first inventory holder at a first location associated with an inventory station, wherein the first location comprises a first space of a queue designated for inventory item processing, the first inventory holder transported to the inventory station by a first mobile drive unit;
receiving the second inventory item from a second inventory holder at the first location associated with the inventory station, the second inventory holder transported to the inventory station by a second mobile drive unit;
receiving a third inventory item from a third inventory holder at a second location associated with the inventory station, wherein the second location is designated for storing one or more inventory items associated with a product velocity and wherein the third inventory holder is fixed at the second location while the order for the first inventory item, the second inventory item and the third inventory item is assembled.

30. The method of claim 29, wherein the third inventory holder is transported to the second location by a third mobile drive unit.

31. The method of claim 29, wherein:
the first inventory holder and the second inventory holder are transported to the first location in response to the order; and
the third inventory holder is transported to the second location in response to a plurality of orders.

32. The method of claim 31, wherein the third inventory holder is transported to the second location in response to a product velocity of the third inventory item.

33. The method of claim 31, wherein the third inventory holder is transported to the second location in response to a product velocity of a plurality of inventory items in the third inventory holder.

34. The method of claim 32, wherein the product velocity is determined based on at least one of past order information, known demand, and predicted future order information.

35. The method of claim 29, further comprising:
determining the third inventory item based on a frequency of a plurality of orders receiving the third inventory item; and
assigning the third inventory holder to the second location based on the frequency.

36. The method of claim 35, wherein determining the third inventory item further comprises determining that the frequency of orders receiving the third inventory item is higher than frequencies of orders receiving the first inventory item and orders receiving the second inventory item.

37. The method of claim 29, further comprising assigning a fourth inventory holder holding a fourth inventory item to the second location.

38. The method of claim 37, further comprising determining that a frequency of a plurality of orders receiving the third inventory item is less than a second frequency of orders receiving a fourth inventory item before assigning the fourth inventory holder to the second location.

39. The method of claim 37, further comprising assigning a task to move the third inventory item to a fifth inventory holder transported to the first location by a fifth mobile drive unit.

40. The method of claim 29, further comprising:
determining that a quantity of the third inventory item at the second location is lower than a threshold; and
assigning a task to transport an additional quantity of the third inventory item to the first location.

41. The method of claim 29, wherein the order includes a fourth inventory item and the method further comprises receiving the fourth inventory item from an array of inventory holders associated with the inventory station.

42. The method of claim 29, further comprising receiving a fourth inventory item from a fourth inventory holder at a third location associated with the inventory station, wherein the fourth inventory holder is fixed at the third location while the inventory station receives the first inventory item, the second inventory item, and the third inventory item.

43. A method, comprising:
receiving a first inventory item into an array associated with an inventory station from a first inventory holder, wherein the array is associated with a product velocity and wherein the first inventory item is received into the array based upon a product velocity associated with the first inventory item, the first inventory holder transported to the inventory station by a first mobile drive unit;
receiving an order for the first inventory item, a second inventory item, and a third inventory item;
receiving the second inventory item from a second inventory holder, the second inventory holder transported to the inventory station by a second mobile drive unit;
receiving the third inventory item from a third inventory holder, the third inventory holder transported to the inventory station by a third mobile drive unit; and
receiving the first inventory item from the array.

44. The method of claim 43, wherein the inventory station comprises a first location and a second location and the first inventory holder, the second inventory holder, and the third inventory holder are received at the first location while a fourth inventory holder is fixed at the second location.

45. The method of claim 43, wherein the first inventory holder comprises a plurality of inventory items and the method further comprises receiving the plurality of inventory items into the array of inventory holders.

46. The method of claim 43, wherein the first inventory holder is transported to the inventory station in response to a plurality of orders, the second inventory holder and the third inventory holder are transported to the inventory station in response to the order, and the first inventory item is received from the array in response to the order.

47. The method of claim 46, wherein the first inventory holder is transported to the inventory station in response to a product velocity of the first inventory item.

48. The method of claim 47, wherein the product velocity is determined based on at least one of past order information, known demand, and predicted future order information.

49. The method of claim 43, further comprising:
determining the first inventory item based on a frequency of a plurality of orders receiving the first inventory item; and
assigning the first inventory item to the array based on the frequency.

50. The method of claim 49, wherein determining the first inventory item further comprises determining that the frequency of orders receiving the first inventory item is higher than frequencies of orders receiving the second inventory item and orders receiving the third inventory item.

51. The method of claim 49, further comprising:
determining the first inventory item based on determining a number of the first inventory item that the array of inventory holders is operable to receive, the number based on a size of the first inventory item.

52. The method of claim 43, further comprising:
determining that a frequency of a plurality of orders receiving the first inventory item is less than a second frequency of orders receiving a fourth inventory item; and
assigning a fourth inventory holder holding the fourth inventory item to transport the fourth inventory item to the inventory station; and
wherein the inventory station is further operable to receive the fourth inventory item into the array.

53. The method of claim 52, further comprising assigning a task to move the first inventory item to the fourth inventory holder.

54. The method of claim 52, further comprising assigning a task to move the first inventory item to a fifth inventory holder transported to the inventory station by a fifth mobile drive unit.

55. The method of claim 43, further comprising:
determining that a quantity of the first inventory item in the array is lower than a threshold; and
assigning a task to transport an additional quantity of the first inventory item to the inventory station.

56. The method of claim 43, further comprising receiving a fourth inventory item from a fourth inventory holder at the inventory station, wherein the fourth inventory holder is fixed at the inventory station while the inventory station receives the second inventory item and the third inventory item.

* * * * *